US012473769B1

(12) United States Patent
Peterson

(10) Patent No.: US 12,473,769 B1
(45) Date of Patent: *Nov. 18, 2025

(54) BI-FOLD OVERHEAD DOOR WITH CONCEALED HYDRAULIC CYLINDER

(71) Applicant: PowerLift Door Consultants, Inc., Lake Benton, MN (US)

(72) Inventor: Richard Ernest Peterson, Lake Benton, MN (US)

(73) Assignee: PowerLift Door Consultants, Inc., Lake Benton, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,502

(22) Filed: Jul. 8, 2022

Related U.S. Application Data

(63) Continuation-in-part of application No. 17/030,917, filed on Sep. 24, 2020, now Pat. No. 11,428,036.

(60) Provisional application No. 63/053,300, filed on Jul. 17, 2020, provisional application No. 62/987,823, filed on Mar. 10, 2020.

(51) Int. Cl.

| | |
|---|---|
| ***E05F 15/51*** | (2015.01) |
| ***E05D 15/26*** | (2006.01) |
| ***E06B 3/48*** | (2006.01) |

(52) U.S. Cl.
CPC ............ *E05F 15/51* (2015.01); *E05D 15/262* (2013.01); *E05D 15/264* (2013.01); *E06B 3/483* (2013.01); *E05Y 2201/454* (2013.01); *E05Y 2201/684* (2013.01); *E05Y 2201/688* (2013.01); *E05Y 2600/45* (2013.01); *E05Y 2900/106* (2013.01); *E05Y 2900/108* (2013.01)

(58) Field of Classification Search
CPC .......... E06B 3/927; E06B 1/522; E06B 3/483; E05F 15/51; E05F 15/59
See application file for complete search history.

(56) References Cited

U.S. PATENT DOCUMENTS

| | | | | | |
|---|---|---|---|---|---|
| 2,067,623 | A * | 1/1937 | Smith | E05F 1/02 | 49/390 |
| 2,936,830 | A * | 5/1960 | Mosher | E05F 15/605 | 160/188 |
| 3,464,161 | A * | 9/1969 | Jonsson | E05D 15/403 | 49/203 |
| 4,427,049 | A * | 1/1984 | Belanger | E05F 15/51 | 160/199 |
| 4,913,215 | A * | 4/1990 | Demukai | E05D 15/262 | 160/207 |

(Continued)

*Primary Examiner* — Gregory J Strimbu
(74) *Attorney, Agent, or Firm* — Glen E. Schumann; Moss & Barnett

(57) ABSTRACT

A bi-fold overhead door system including a door frame, an overhead door and a hydraulic cylinder. The frame and the overhead door have corresponding slots formed therein. A top member of the door is pivotally mounted to the door frame. The hydraulic cylinder includes a first cylinder end and a second cylinder end. The first cylinder end is operably attached to the frame. The second cylinder end is operably attached to the overhead door. The hydraulic cylinder is capable of moving the overhead door between a closed configuration and an open configuration. When the door is in the closed configuration, the hydraulic cylinder is substantially recessed within the frame and door slots.

8 Claims, 5 Drawing Sheets

(56) References Cited

U.S. PATENT DOCUMENTS

| | | | | |
|---|---|---|---|---|
| 6,883,273 | B2 * | 4/2005 | Kerkvliet | E05F 15/53 49/203 |
| 9,273,507 | B2 * | 3/2016 | Petrat | E05F 15/53 |
| 11,428,036 | B1 * | 8/2022 | Peterson | E05D 15/262 |
| 11,549,294 | B1 * | 1/2023 | Peterson | E05F 15/53 |
| 2008/0086947 | A1 * | 4/2008 | Crown | E05F 15/51 49/199 |
| 2013/0319623 | A1 * | 12/2013 | Crown | E06B 3/483 160/229.1 |

* cited by examiner

BI-FOLD OVERHEAD DOOR WITH CONCEALED HYDRAULIC CYLINDER

REFERENCE TO RELATED APPLICATION

This application is a continuation-in-part of U.S. application Ser. No. 17/030,917, filed Sep. 24, 2020, and claims priority to U.S. Applic. No. 63/053,300, which was filed on Jul. 17, 2020, and claims priority to U.S. Applic. No. 62/987,823, which was filed on Mar. 10, 2020. The contents of which are incorporated herein by reference.

FIELD OF THE INVENTION

The invention relates generally to bi-fold overhead doors. More particularly, the invention relates to bi-fold overhead door with a concealed hydraulic cylinder.

BACKGROUND OF THE INVENTION

Overhead doors are commonly used to provide relatively large openings such as in machine sheds, barns and airplane hangars. The overhead doors typically utilize a hydraulic cylinder or electric actuators to assist with moving the door leaf between open and closed configurations. An example of one such overhead door system is described in U.S. Patent Publication No. 2011/0225895, which is assigned to the assignee of this application.

SUMMARY OF THE INVENTION

An embodiment of the invention is directed to a bi-fold overhead door system that includes a frame, a bi-fold overhead door and a hydraulic cylinder. The frame has a frame slot formed therein. The bi-fold overhead door includes an upper door leaf and a lower door leaf. The upper door leaf is pivotally mounted to the frame. The upper door leaf has a first major surface. The upper door leaf has a door slot formed therein. The lower door leaf is pivotally mounted to the upper door leaf. The hydraulic cylinder has a first cylinder end and a second cylinder end. The first cylinder end is operably attached to the frame. The second cylinder end is operably attached to the upper door leaf. The hydraulic cylinder is capable of moving the bi-fold overhead door between a closed configuration and an open configuration. The hydraulic cylinder is substantially recessed in the frame slot and the door slot when the bi-fold overhead door is in the closed configuration so that no portion of the hydraulic cylinder extends past the first major surface when the bi-fold overhead door is in the closed configuration.

Another embodiment of the invention is directed to a method of operating a bi-fold overhead door. An upper door leaf is pivotally mounted with respect to a frame. The upper door leaf has a first major surface. The upper door leaf has a door slot formed therein. The frame has a frame slot formed therein. A lower door leaf is pivotally mounted with respect to the upper door leaf. The upper door leaf is operably attached to the frame with a hydraulic cylinder. The hydraulic cylinder has a first cylinder end and a second cylinder end. The first cylinder end is operably attached to the frame. The second cylinder end is operably attached to the upper door leaf. The bi-fold overhead door is moved between a closed configuration and an open configuration using the hydraulic cylinder. The hydraulic cylinder is substantially recessed in the frame slot and the door slot when the bi-fold overhead door is in the closed configuration so that no portion of the hydraulic cylinder extends past the first major surface when the bi-fold overhead door is in the closed configuration.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
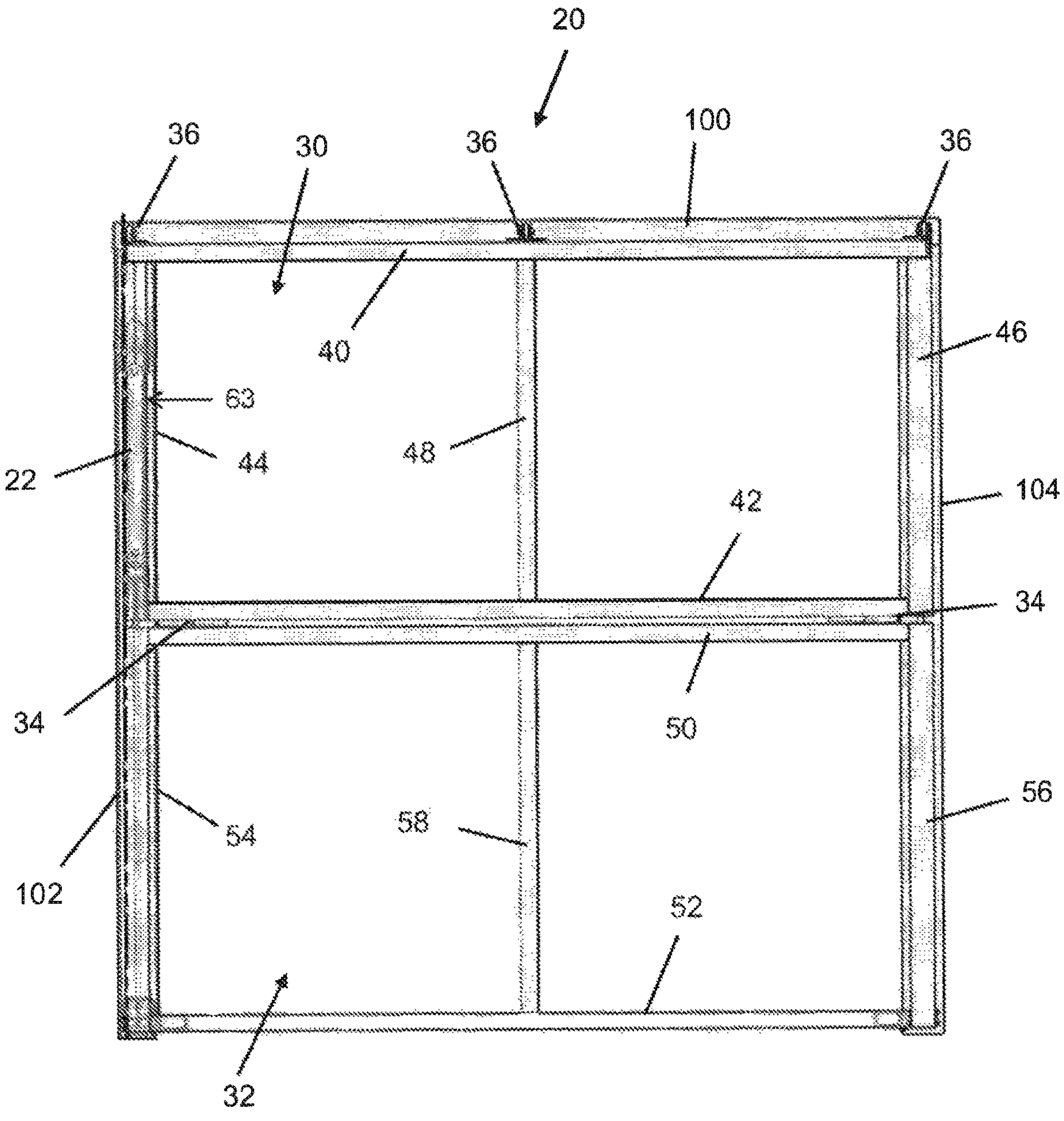
FIG. 1 is an inside elevation view of the bi-fold overhead door with a concealed hydraulic cylinder according to an embodiment of the invention where the bi-fold overhead door is in a closed configuration.
Figure 2:
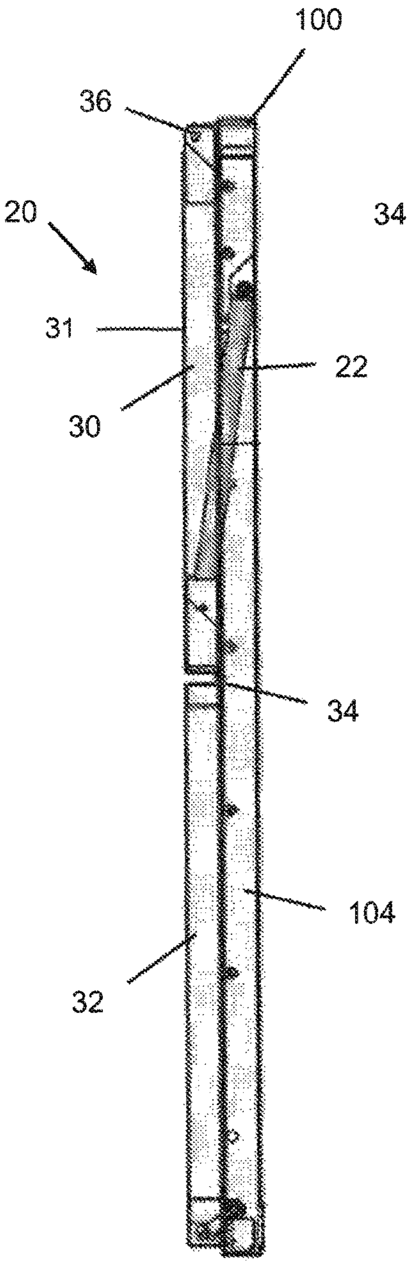
FIG. 2 is a side view of the bi-fold overhead door in the closed configuration.
Figure 3:
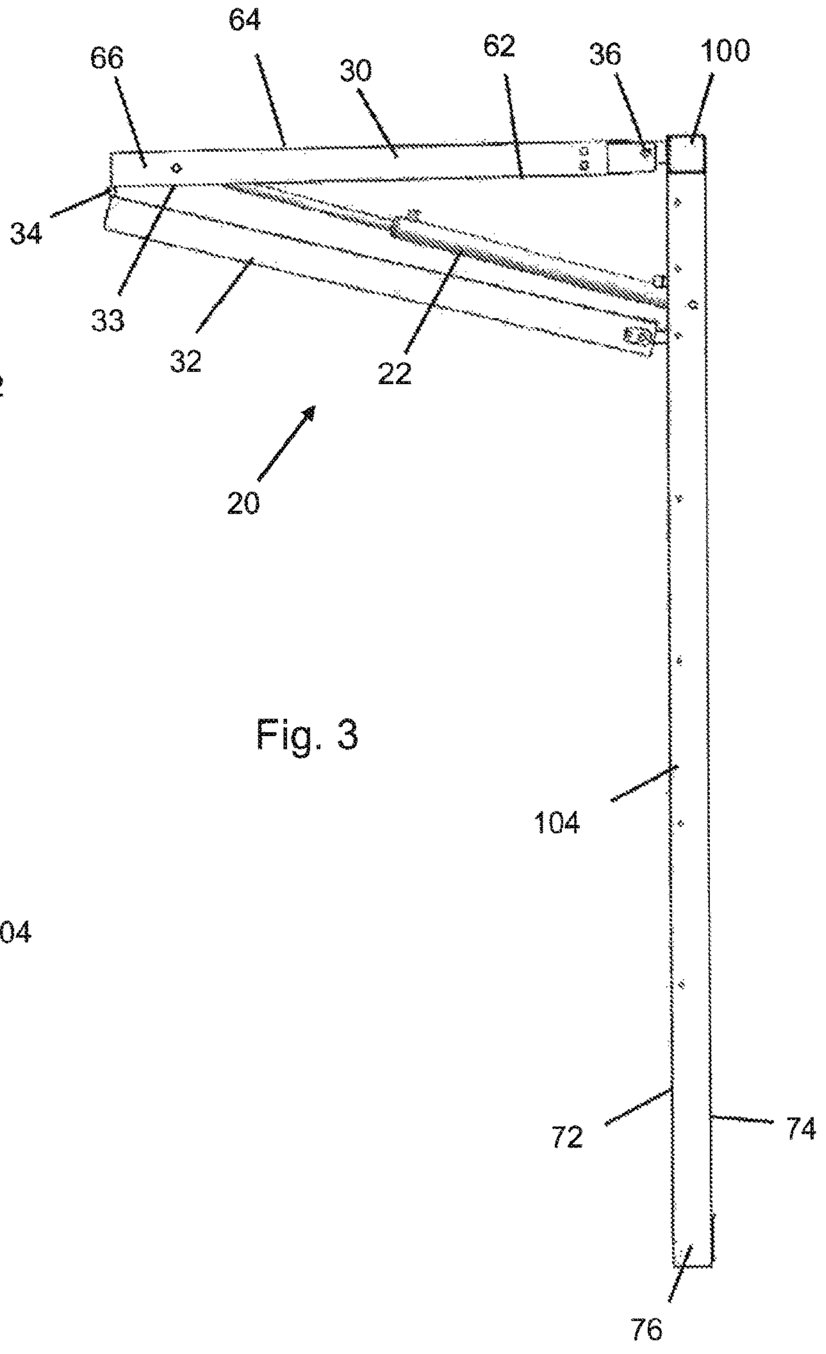
FIG. 3 is a side view of the bi-fold overhead door in an open configuration.
Figure 4:
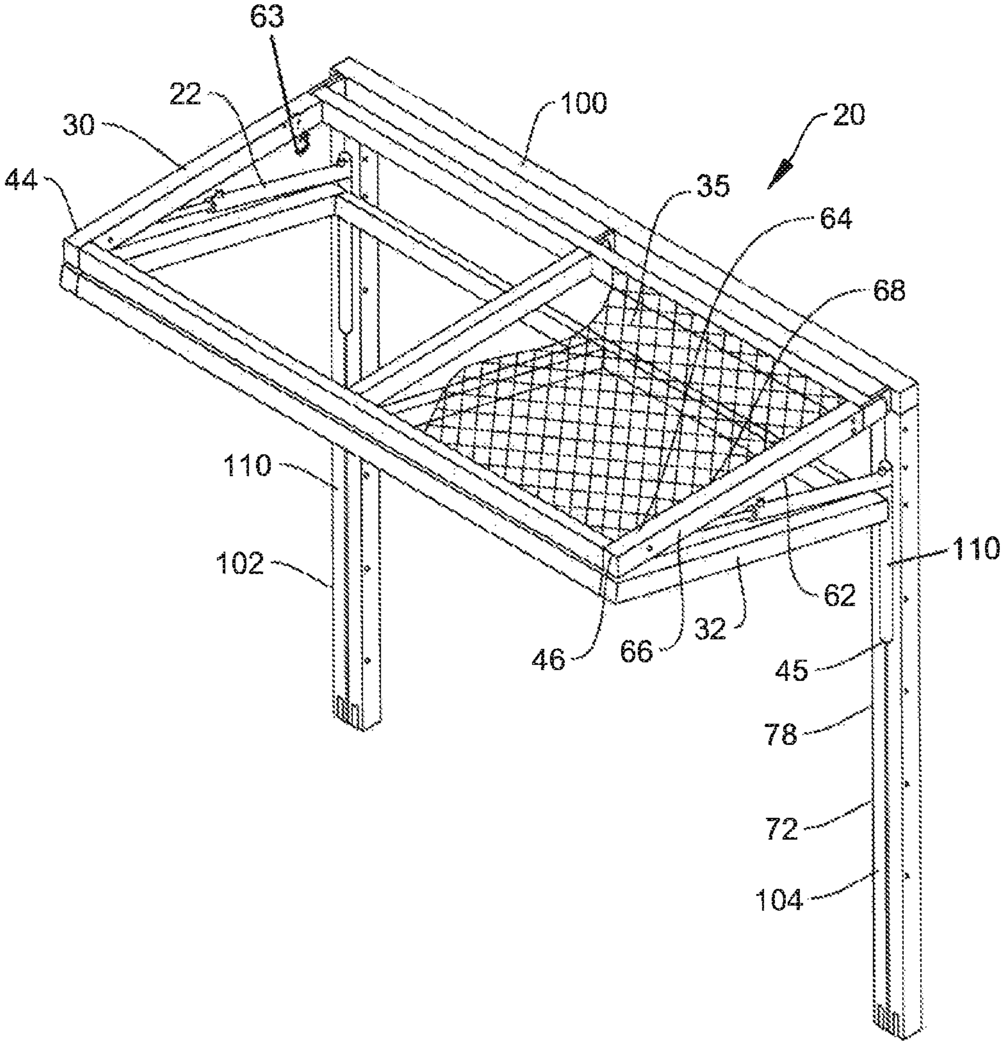
FIG. 4 is a perspective view of the bi-fold overhead door in the open configuration with door panels removed so that frame elements can be better visualized.

The invention generally includes a bi-fold overhead door 20 that is movable between a closed configuration illustrated in FIGS. 1 and 2 and an open configuration illustrated in FIGS. 3 and 4 utilizing at least one hydraulic cylinder 22.

In certain embodiments, the bi-fold overhead door 20 is vertically pivotable between the open configuration and the closed configuration. The bi-fold overhead door 20 is particularly suited for use with a relatively wide bi-fold overhead door such as having a width of more than about 20 feet.

When the bi-fold overhead door 20 is in the closed configuration, the hydraulic cylinder 22 is substantially concealed. As used herein, concealed means that no portion of the hydraulic cylinder 22 extends past a surface of the bi-fold overhead door 20 that is opposite the door frame as illustrated in FIG. 2 and no portion of the hydraulic cylinder extends beyond a surface of the door frame that is oriented opposite the surface of the bi-fold overhead door when the bi-fold overhead door is in the closed configuration as illustrated in FIG. 1.

Substantially concealing the hydraulic cylinder 22 when the bi-fold overhead door 20 is in the closed configuration not only enhances the aesthetics of the bi-fold overhead door 20 but also protects the hydraulic cylinder 22 from damage.

The bi-fold overhead door 20 generally includes an upper door leaf 30 and a lower door leaf 32, as illustrated in FIGS. 1-4. In certain embodiments, the upper door leaf 30 and the lower door leaf 32 both have a generally rectangular or square configuration depending on the shape of the opening that is intended to be covered with the bi-fold overhead door 20.

While it is illustrated that the upper door leaf 30 and the lower door leaf 32 have a similar height and width, it is possible for the upper door leaf 30 and the lower door leaf 32 to be formed with different heights and widths depending on the shape of the opening that is intended to be covered with the bi-fold overhead door 20.

The upper door leaf 30 generally includes an upper door member 40, a lower door member 42, a first side door member 44 and a second side door member 46. The first side door member 44 extends between the upper door member 40 and the lower door member 42. The second side door member 46 extends between the upper door member 40 and the lower door member 42.

Depending on the size of the upper door leaf 30, the upper door leaf 30 may include at least one intermediate support member 48 that extends between the upper door member 40 and the lower door member 42.

In certain embodiments, the side door members 44, 46 may have a generally square profile that includes a first side 62, a second side 64, a third side 66 and a fourth side 68. The first side 62 is oriented towards the door frame. The second side 64, which is opposite the first side 62, is oriented away from the door frame.

The third side 66 extends between the first side 62 and the second side 64. The fourth side 68, which is opposite the third side 66, extends between the first side 62 and the second side 64. An opening is defined inside of the first side 62, the second side 64, the third side 66 and the fourth side 68.

The first side 62 may have a door slot 63 formed therein that is adapted to receive a portion of the at least one hydraulic cylinder 60. The door slot 63 extends through the first side 62 into the opening. The door slot 63 may have a generally elongated shape that is vertically oriented. The door slot 63 has a width that is greater than a width of the at least one hydraulic cylinder 60.

A person of skill in the art will appreciate that it is possible for the side door members 44, 46 to have an alternative configuration with less than four sides. For example, in an alternative configuration, the side door members 44, 46 may have only two sides using the concepts of the invention.

The upper door leaf 30 may be viewed as having a first major surface 31 and a second major surface 33, which is opposite the first major surface 31. The first major surface 31 and the second major surface 33 both extend between the door members 40, 42, 44, 46 that extend around an edge of the upper door leaf 30.

Another way of viewing the upper door leaf 30 is that the door slot 63 is formed in the second major surface 33 and the first major surface 31 is oriented on the upper door leaf 30 opposite the door slot 63.

In one representative configuration, the first major surface 31 is oriented towards an inside of a building to which the bi-fold overhead door 20 is attached and the second major surface 33 is oriented towards an outside of a building to which the bi-fold overhead door 20 is attached.

The door members 40, 42, 44 and 46 thereby define a frame to which a skin 35 is attached to substantially enclose the upper door leaf 30 as is customary in the industry. The skin 35 typically extends over at least one of the first major surface 31 and the second major surface 33.

A person of skill in the art will appreciate that the skin 35 may be fabricated from a variety of materials using the concepts of the invention. In certain embodiments, the skin 35 is fabricated from a metallic material such as aluminum, fiberglass, wood or glass. The skin 35 may be fabricated from a single piece of material. Alternatively, the skin 35 may be fabricated from a plurality of panels.

The lower door leaf 32 generally includes an upper door member 50, a lower door member 52, a first side door member 54 and a second side door member 56. The first side door member 54 extends between the upper door member 50 and the lower door member 52. The second side door member 56 extends between the upper door member 50 and the lower door member 52.

Depending on the size of the lower door leaf 32, the lower door leaf 32 may include at least one intermediate support member 58 that extends between the upper door member 50 and the lower door member 52.

The upper door leaf 30 is pivotally attached to the lower door leaf 32 with at least one intermediate hinge 34. In certain embodiments, one of the intermediate hinges 34 is mounted proximate to each opposite side edge of the upper door leaf 30 and the lower door leaf 32.

The frame may include a top frame member 100, a first side frame member 102 and a second side frame member 104. The top frame member 100 may be formed with a generally square profile such as illustrated in FIGS. 2 and 3. While FIG. 1 illustrates that the top frame member 100 extends substantially across the bi-fold overhead door 20, it is possible for the top frame member 100 to be formed in sections such as in locations where the upper hinges 36 are to be attached to the top frame member. The top frame member 100 may be oriented generally perpendicular to the first side frame member 102 and the second side frame member 104.

In certain embodiments, the side frame members 102, 104 may have a generally square profile that includes a first side 72, a second side 74, a third side 76 and a fourth side 78. The first side 72 is oriented towards the bi-fold overhead door. The second side 74, which is opposite the first side 72, is oriented away from the bi-fold overhead door.

The third side 76 extends between the first side 72 and the second side 74 towards an interior of the door frame. The fourth side 78, which is opposite the third side 76, extends between the first side 72 and the second side 74 away from an interior of the door frame. An opening is defined inside of the first side 72, the second side 74, the third side 76 and the fourth side 78.

The first side 72 has a frame slot 110 formed therein. The frame slot 110 extends through the first side 72 into the opening. The frame slot 110 may have a generally elongated shape that is vertically oriented. The frame slot 110 has a width that is greater than a width of the at least one hydraulic cylinder 22.

The frame slot 110 is thereby oriented towards the door slot 63 when the bi-fold overhead door 20 is in the closed configuration so that the hydraulic cylinder 22 can be substantially recessed in the frame slot 110 and the door slot 63 when the bi-fold overhead door 20 is in the closed configuration. In certain embodiments, the frame slot 110 is oriented towards the inside of the building to which the bi-fold overhead door 20 is attached.

A person of skill in the art will appreciate that it is possible for the side frame member 102, 104 to have an alternative configuration with less than four sides. For example, in an alternative configuration, the side frame member 102, 104 may have only two sides using the concepts of the invention.

Similar to the upper door leaf 30, the lower door leaf 32 may be viewed as having a first major surface, a second major surface, which is opposite the first major surface, and a skin that is attached thereto substantially enclose the lower door leaf 32 as is customary in the industry.

The upper door leaf 30 may be pivotally attached to the top frame member 100 with at least one upper hinge 36. In certain embodiments, one of the upper hinges 36 is provided proximate opposite ends of the upper door leaf 30. Depending on the width of the upper door leaf 30, there may be at least one central upper hinge 36. Alternatively, the upper door leaf 30 may be pivotally attached to the first side member 102 and the second side member 104.

In certain embodiments, the top frame member 100 is mounted to the structure (not shown) in a generally horizontal orientation. However, a person of skill in the art will appreciate that it is possible for the top frame member 100 to be mounted in different orientations.

Similar to the top frame member 100, the first side frame member 102 may be formed with a generally square profile. In certain embodiments, the first side frame member 102 is mounted proximate a first end of the top frame member 100 and extends in a generally vertical orientation from an upper end of the upper door leaf 30 to a lower end of the lower door leaf 32.

Figure 5:
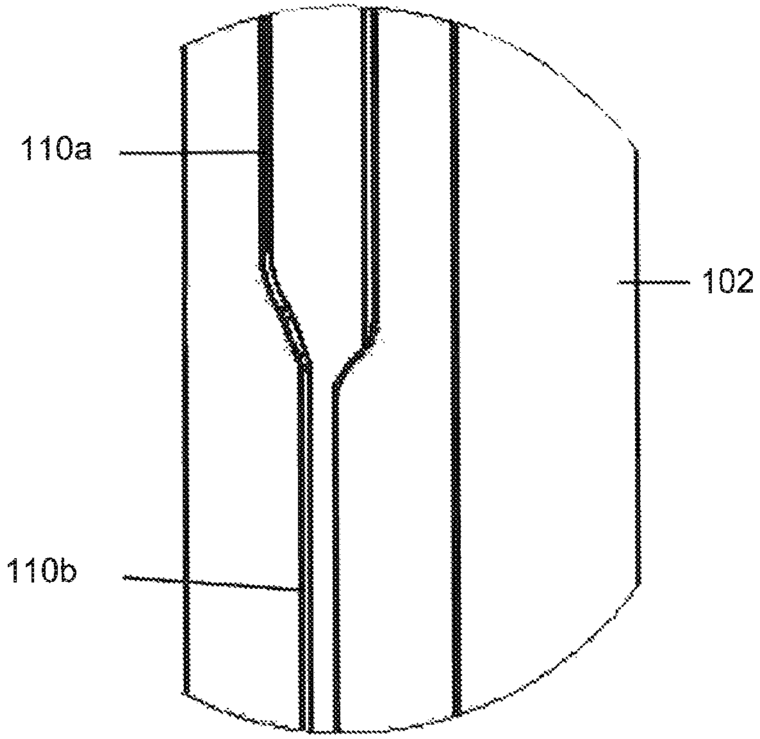
FIG. 5 is a perspective view of an upper portion of a slot in a side frame member of the bi-fold overhead door with the concealed hydraulic cylinder.
Figure 6:
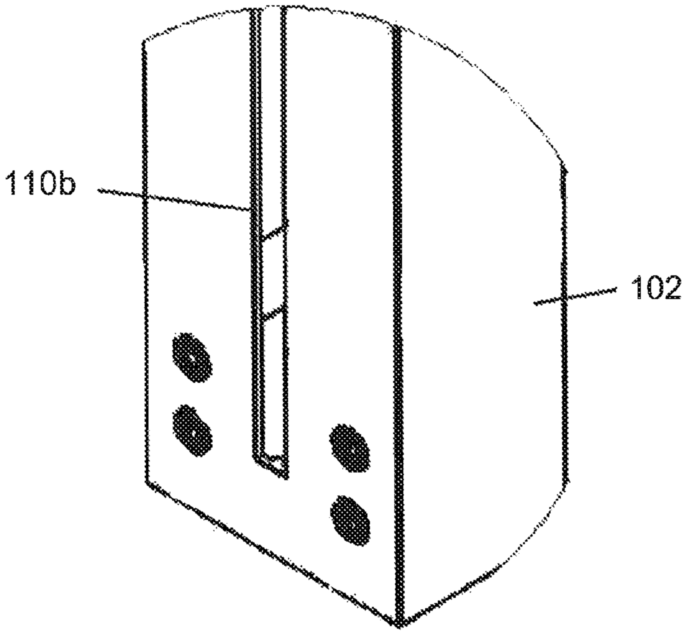
FIG. 6 is a perspective view of a lower portion of the slot in the side frame member.

The frame slot 110 includes a first frame slot section **110*a* and a second frame slot section 110*b*. Proximate an upper end of the first side frame member 102, the first frame slot section 110*a* has a width that is slightly wider than a width of the hydraulic cylinder 22 as illustrated in FIG. 5. Proximate a lower end of the first side frame member 102, the second frame slot section 110*b*, which is illustrated in FIG. 6, has a width that is narrower than the width of the hydraulic cylinder 22 but that is wider than a linkage arm 110**, which is discussed in more detail herein.

The frame slot 110 transitions from the wider width (**110*a*) to the narrower width (110*b*) at a point that is sufficiently lower such that the hydraulic cylinder 22 does not contact the first side frame member 102 when the bi-fold overhead door 20 is in the closed configuration as illustrated in FIG. 2**.

Similar to the first side frame member 102, the first side door member 44 has a door slot 45 formed therein that is adapted to receive a portion of the hydraulic cylinder 22 when the bi-fold overhead door 20 is in the closed configuration. The door slot 45 has a width that is slightly wider than the width of the hydraulic cylinder 22.

The first end of the hydraulic cylinder 22 may be mounted inside of the first side frame member 102 proximate the wider first frame slot section **110*a*, as illustrated in FIG. 4. The second end of the hydraulic cylinder may be mounted inside of the first side door member 44 proximate the door slot 45 formed therein. This configuration enables the hydraulic cylinder 22 to be concealed partially inside of the first side frame member 102 and partially inside of the first side door member 44 when the bi-fold overhead door 20** is in the closed configuration.

Proximate a lower end of the lower door leaf 32, a guide wheel assembly is provided to maintain the lower end of the lower door leaf 32 adjacent to the first side frame member 102 such as illustrated in FIGS. 2 and 3 and the bi-fold overhead door 20 moves between the open and closed configurations.

Figure 7:
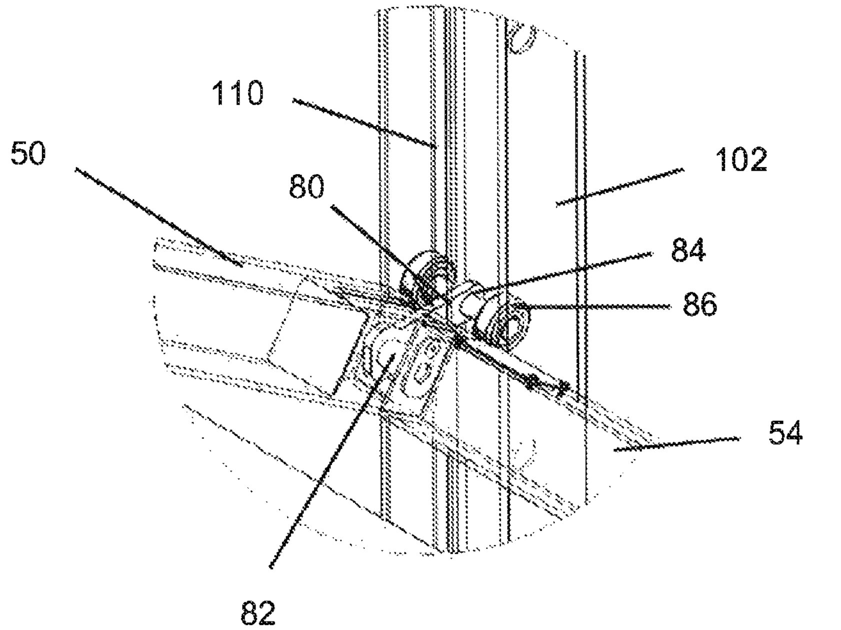
FIG. 7 is a partially in phantom perspective view illustrating engagement of a lower end of a lower door leaf to the side frame member when the bi-fold overhead door is in the open configuration.
Figure 8:
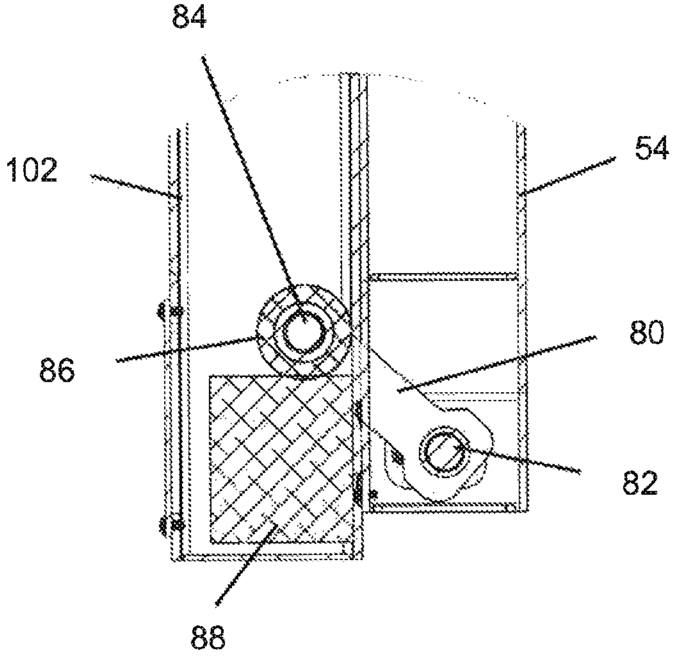
FIG. 8 is a side view illustrating the lower end of the lower door leaf when the bi-fold overhead door is in the closed configuration.

The guide wheel assembly includes a linkage arm 80 that is pivotally mounted to the side door member 54 for pivoting about an axle 82 as illustrated in FIGS. 7 and 8. A shaft 84 is attached to an end of the linkage arm 80 that is opposite the axle 82. At least one roller 86 is rotatably mounted to the shaft 84. In certain embodiments, there are 2 rollers 86 attached to opposite ends of the shaft 84.

The linkage arm 80 extends through the frame slot 110 as illustrated in FIG. 7. The rollers 86 are mounted to the shaft 84 at a width that is greater than the width of the frame slot 110. This configuration causes the rollers to be retained inside of the first side frame member 102 as the bi-fold overhead door 20 is moved between the open and closed configurations.

As the bi-fold overhead door 20 approaches the closed configuration, which is illustrated in FIG. 8, the rollers 86 contact a stopper block 88 mounted at the lower end of the first side frame member 102. The stopper block 88 pulls the lower door leaf 32 towards the first side frame member 102 to reduce the potential of water leaking between the lower door leaf 32 and the first side frame member 102.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A bi-fold overhead door system comprising:

a frame including a horizontal frame member, a first vertical frame member secured to a first end of the horizontal frame member and a second vertical frame member secured to a second end of the horizontal frame member, the first vertical frame member having a recess formed therein;

a bi-fold overhead door having a width greater than the distance between the first and second vertical frame members, comprising:

an upper door leaf with a recess formed therein, the upper door leaf being pivotally mounted to the frame; and a lower door leaf that is pivotally mounted to the upper door leaf; and at least one hydraulic cylinder comprising a first cylinder end and a second cylinder end, wherein the first cylinder end is operatively attached to the frame, wherein the second cylinder end is operatively attached to the upper door leaf, wherein the hydraulic cylinder is capable of moving the bi-fold overhead door between a closed configuration and an open configuration with respect to the frame, and wherein the hydraulic cylinder is operatively aligned with and substantially enclosed in the first vertical frame member recess and the upper door leaf recess when the bi-fold overhead door is in the closed configuration.

2. The bi-fold overhead door system of claim 1, wherein the first end of the at least one hydraulic cylinder is mounted to the first vertical frame member within the first vertical frame member recess.

3. The bi-fold overhead door system of claim 1, wherein the second end of the at least one hydraulic cylinder is mounted to the upper door leaf within the upper door leaf recess.

4. The bi-fold overhead door system of claim 1 further comprising a second hydraulic cylinder having a first cylinder end and a second cylinder end, wherein the first cylinder end of the second hydraulic cylinder is operatively attached to the second vertical frame member and, the second cylinder end of the second hydraulic cylinder is operatively attached to the upper door leaf, and wherein the second hydraulic cylinder is capable of moving the bi-fold overhead door between the closed configuration and the open configuration with respect to the frame, and wherein there is at least one recess formed in the second vertical frame member and a second recess formed in the upper door leaf, such that when the bi-fold overhead door is in the closed configuration, the second hydraulic cylinder is substantially enclosed within the second vertical frame member recess and the second upper door leaf recess.

5. The bi-fold overhead door system of claim 1, wherein the upper door leaf is pivotally mounted to the frame with at least one upper hinge and wherein the upper door leaf is pivotally mounted to the lower door leaf with at least one intermediate hinge.

6. The bi-fold overhead door system of claim 1, wherein at least one of the first and second vertical frame members includes a vertical slot, the bi-fold overhead door system further comprising a guide wheel assembly attached to the lower door leaf, wherein the guide wheel assembly comprises a linkage arm having a first end secured to the lower door leaf and a second end that extends through the vertical slot, and a roller assembly having a width wider than a width of the slot secured to the second end of the linkage arm to prevent the linkage arm from being extracted from the slot.

7. The bi-fold overhead door system of claim 6, wherein the linkage arm is pivotally mounted to the lower door leaf.

8. The bi-fold overhead door system of claim 6, further comprising a stopper block mounted to the at least one of the first and second vertical frame members, wherein the roller assembly engages the stopper block when the bi-fold overhead door is in the closed configuration.

* * * * *